(12) United States Patent
Wu et al.

(10) Patent No.: US 7,313,368 B2
(45) Date of Patent: Dec. 25, 2007

(54) DUAL BAND TRANSCEIVER ARCHITECTURE FOR WIRELESS COMMUNICATION

(75) Inventors: Szu-Hsien Wu, Hsinchu (TW); Chao-Shiun Wang, Hsinchu (TW); Tzu-Yi Yang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 535 days.

(21) Appl. No.: 10/713,022

(22) Filed: Nov. 17, 2003

(65) Prior Publication Data

US 2004/0224644 A1    Nov. 11, 2004

(30) Foreign Application Priority Data

May 8, 2003    (TW) .............................. 92112547 A (51) Int. Cl.
*H04B 1/38*    (2006.01)

(52) U.S. Cl. .................. 455/73; 455/78; 455/552.1
(58) Field of Classification Search ............ 455/73–86, 455/552.1, 553.1, 101, 103, 132
See application file for complete search history.

(56) References Cited

U.S. PATENT DOCUMENTS 6,128,476 A * 10/2000 Fujita ......................... 455/101
6,728,517 B2 * 4/2004 Sugar et al. .................. 455/73

* cited by examiner

*Primary Examiner*—Lee Nguyen
(74) *Attorney, Agent, or Firm*—Birch, Stewart, Kolasch & Birch, LLP (57) ABSTRACT

The present invention relates to a dual band transceiver architecture for wireless communication. A high frequency integrated circuit is used for converting down the received multi-mode frequency signal, and then a decoding circuit for base frequency will perform the processes of up-sampling and emitting a signal so as to transmit/receive the dual band signal by using a single frequency synthesizer.

27 Claims, 5 Drawing Sheets

DUAL BAND TRANSCEIVER ARCHITECTURE FOR WIRELESS COMMUNICATION

BACKGROUND OF THE INVENTION

1. Field of the Invention

The present invention relates to a dual band transceiver architecture for wireless communication. A signal reception portion and a signal emission portion are used for processing the multi-mode dual band transmitting/receiving signal so as to accomplish the receiving and emitting of the signal.

2. Description of the Prior Art

In the recent decades, due to the ban lifting by military and the development of technology, the wireless communication gradually replaces the traditional wired telephone communication and the unidirectional wireless transmitting/receiving. Furthermore, the function for transmitting massages merely by voice cannot meet the user's requirements. In order to promote the transmission quality and the functional service of the wireless communication, different communication protocols are established and applied. For example, in the third generation of mobile communication protocol, the bandwidth cannot be effectively applied and arranged, and therefore, the 2.4 GHz (gigahertz) communication band is selected. Practically, in the international protocol, the industrial, scientific and medical band (ISM Band) not only comprises 2.4 GHz band, but also has 5 GHz band. Therefore, some communication businesses have applied their products in this common-used band due to the free charge, openness and applicability of the common-used communication band.

Because of the applicability of the ISM band, many communication protocols are provided with the ISM band. The ISM band has been used in the 2.4 GHz and 5 GHz bands, such as 802.11a and 802.11b communication protocols for wireless local access network (WLAN) and the band for the Bluetooth technology are applied. Conventionally, the design of the product applying this communication protocol is to use two sets of transmitting/receiving devices and multiple frequency synthesizers to separately receive signals form different bands. If single one synthesizer is used for performing the modulation for the signal, only one band signal is processed by this design.

Figure 1:
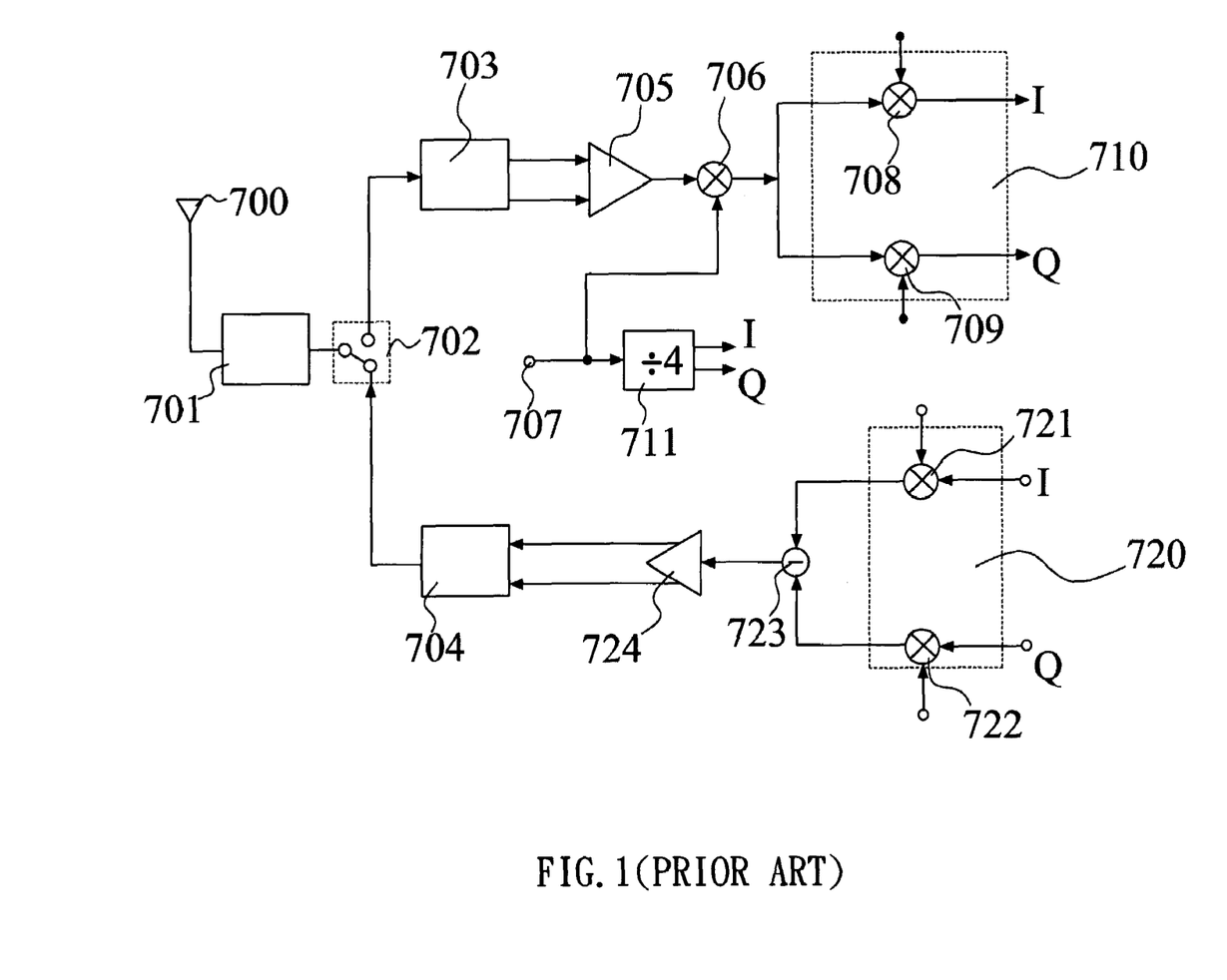
FIG. 1 is a perspective diagram of a prior art frequency synthesizing circuit.

Please refer to FIG. 1. FIG. 1 is a perspective diagram of a prior art frequency synthesizing circuit. The prior art circuit comprises an antenna 700 connected to a band-pass filter 701, and the band-pass filter 701 is connected to a switch 702. When the antenna 700 receives the signal, the switch 702 will be so switched that the band-pass filter 701 will be connected to the first balance/imbalance device 703. Then, a low noise amplifier 705 will output the signal to a wave-mixing device 706, and the wave-mixing device 706 will receive a signal outputted by the low noise amplifier 705, and will receive an oscillation signal outputted by a local oscillator 707. The obtained down-converted signal will be outputted to a 1.06 G orthogonal wave-mixing device 710 separately connected to a seventh orthogonal wave-mixing device 708 and an eighth orthogonal wave-mixing device 709. Because the seventh orthogonal wave-mixing device 708 and the eighth orthogonal wave-mixing device 709 will receive signal outputted by the wave-mixing device 706 and further receive a 1.06 G orthogonal signal separately. Therefore, the signal is wave-mixed with the orthogonal signal so as to output an orthogonal down-converted signal and accomplish the down-conversion modulation for the signal.

In the signal emission portion, the orthogonal emitting the base frequency signal is separately inputted into the ninth orthogonal wave-mixing device 721 and the tenth orthogonal wave-mixing device 722 in the 5.3 G orthogonal wave-mixing device 720. Because the ninth orthogonal wave-mixing device 721 and the tenth orthogonal wave-mixing device 722 will separately receive a 5.3 GHz orthogonal up-sampling inputted from outside. Then, the signals are separately outputted to a subtractor 723 so as to connected to a power amplifier 724 via the subtractor 723. After the power amplifying for the signal is performed, the signal is then transmitted to another balance/imbalance device 704 for impedance matching. And the switch 702 will emit the signal by using the band-pass filter 701 and the antenna 700.

As described above, the prior art applies a single frequency synthesizer and the advantage of the circuit design so as to achieve the object of high integrality and simplifying the difficulty of design. However, the prior art technology merely solves the problems for the 5 GHz band, and cannot integrally modulate the multi-mode and multi-band signals.

SUMMARY OF THE INVENTION

In order to solve the drawbacks of the prior art, the present invention provides a dual band transceiver architecture for wireless communication to be used for signal receiving and emitting. More particularly, the modulation for the multi-band signal will be accomplished by applying the local oscillation frequency and by using a single frequency synthesizer.

The object of the present invention is to provide a transceiver architecture applying a dual band single frequency synthesizer. The inventive circuit is highly integrated so as to reduce the number of the outside elements and the interference of the mirror image signal. By applying the method of up-sampling and down-converting the signal twice in the transmitting/receiving device, the received signal will be down-converted to the base frequency so as to accomplish the transmitting/receiving device suitable to be used in the Industrial, Scientific and Medical Bands (ISM Bands) for 2.4 GHz and 5 GHz.

The present invention not only can achieve the object of simplifying the circuit, but also can promote the efficiency of the elements so as to avoid the drawbacks of the prior art.

BRIEF DESCRIPTION OF THE DRAWINGS

The accompanying drawings, which are incorporated in and form part of the specification in which like numerals designate like parts, illustrate preferred embodiments of the present invention and together with the description, serve to explain the principles of the invention. In the drawings.

DETAILED DESCRIPTION OF THE PREFERRED EMBODIMENT

The present invention relates to a dual band transceiver architecture for wireless communication. The architecture comprises a transmitter, a receiver and a single frequency synthesizer. The appropriate local oscillator frequency is so mixed that the radio frequency signals for 2.4 GHz and 5 GHz Industrial, Scientific and Medical Bands (ISM Bands) can be received and emitted at the same time. This makes the inventive architecture can be broadly applied in present wireless communication system.

Figure 2:
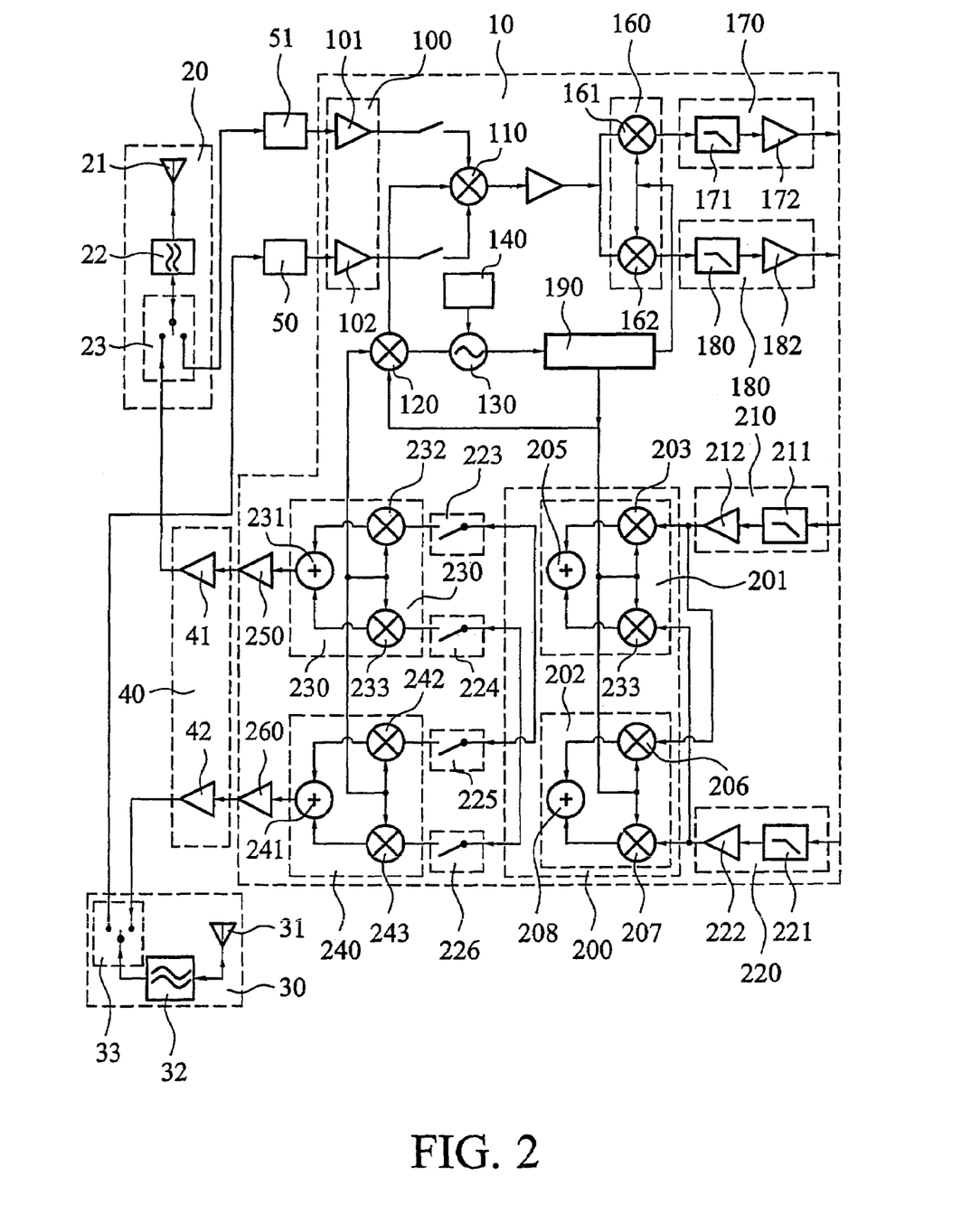
FIG. 2 is a perspective diagram of a circuit according to the embodiment of the present invention.

Please refer to FIG. 2. FIG. 2 is a perspective diagram of a circuit according to the embodiment of the present invention. The inventive circuit comprises a first and a second transmitting/receiving antennas 20, 30, and the two transmitting/receiving antennas 20, 30 are connected to a high frequency integrated circuit 10 via a power amplifying device 40 and balance/imbalance devices 50, 51. The first transmitting/receiving antenna 20 comprises a first band transmitting/receiving antenna 21, a first band-pass filter 22 and a first switch 23. The first transmitting/receiving antenna 20 is used for transmitting/receiving the 2.4 GHz band signal, and is connected to the first band-pass filter 22 for filtering the signal. The first switch 23 is switched to receive or emit the signal.

Furthermore, the second transmitting/receiving antenna 30 is similar to the first transmitting/receiving antenna 20, and comprises a second band transmitting/receiving antenna 31, a second driving filter 32 and a second switch 33. When the second transmitting/receiving antenna 30 transmits/receives 5 GHz band signal, the second band transmitting/receiving antenna 31 will collect the 5 GHz signal to be processed by the second band-pass filter 32, and the second switch 33 will be switched to receive or emit the signal.

When the first transmitting/receiving antenna 20 or the second transmitting/receiving antenna 30 is receiving the signal, the first switch 23 or the second switch 33 is switched to receive the signal and is connected to the first balance/imbalance device 50 or the second balance/imbalance device 51. When emitting the signal, the switch is switched to be connected to the power amplifying device 40. Because the power amplifying device 40 comprises a first power amplifier 41 and a second power amplifier 42 so as to be separately connected to the first switch 23 and the second switch 33. The emitting signal will be transmitted to the appropriate band antenna for signal emitting.

When the mentioned two signal transmitting/receiving antenna 20, 30 are receiving/emitting signal, the balance/imbalance device 50, 51 are connected to the power amplifying device 40 so that the high frequency integrated circuit 10 will convert down and sample up the signal for modulation. The high frequency integrated circuit 10 is divided into two portions. One is a signal reception portion, and another is a signal emission portion. The signal reception portion is used for receiving the signal and then converting down the signal. The signal emission portion is used for receiving the base frequency signal and then sampling up the signal for modulation.

In terms of the signal reception portion, when the first transmitting/receiving antenna 20 or the second transmitting/receiving antenna 30 receives the 2.4 GHz or 5 GHz high frequency communication signal, the first balance/imbalance device 50 or the second balance/imbalance device 51 will perform the impedance matching for the received signal and input the signal to the high frequency integrated circuit 10. And then the receiving frequency selection unit 100 will receive the signal. The receiving frequency selection unit 100 comprises a first low noise amplifier 101 and a second low noise amplifier 102. Therefore, in this embodiment, the first low noise amplifier 101 is used for receiving the signal outputted by the first transmitting/receiving antenna 20, namely, 2.4 GHz high frequency communication signal, and the second low noise amplifier 102 is used for receiving the 5 GHz high frequency communication signal outputted by the second transmitting/receiving antenna 30. The 2.4 GHz and 5 GHz signals cannot be received at the same time, and therefore, after the first low noise amplifier 101 and the second low noise amplifier 102 output the signal to the following first high frequency wave-mixing device 110, the first high frequency wave-mixing device 110 will further receive the high frequency local oscillation frequency outputted by the first high frequency local oscillator 120. Thus, the selection for the working band can be achieved, and the first down-conversion can be performed. The high frequency signal and the high frequency local oscillation frequency will be wave-mixed so as to obtain a middle frequency received signal.

Next, the middle frequency received signal will be inputted to the first middle frequency amplifying device 150 for signal amplifying so as to promote the resolution of the following signal modulation. Thereafter, the middle frequency amplified signal will be inputted to the middle frequency wave-mixing device 160. This middle frequency wave-mixing unit 160 comprises a first middle frequency wave-mixing device 161 and a second middle frequency wave-mixing device 162. The first middle frequency wave-mixing device 161 and the second middle frequency wave-mixing device 162 not only receive the middle frequency amplified signal, but also receive the orthogonal signal outputted by the orthogonal distributor 190 at the same time. By using this orthogonal signal, the middle frequency amplified signal received by the first middle frequency wave-mixing device 161 and the second middle frequency wave-mixing device 162 will be divided and down converted so as to obtain two orthogonal base frequency signals. The difference of the phases of the two orthogonal base frequency signals is 90 degrees. Then, the two orthogonal base frequency signals are separately inputted to the first orthogonal filtering amplifying unit 170 and the second orthogonal filtering amplifying unit 180. The first orthogonal filtering amplifying unit 170 and the second orthogonal filtering amplifying unit 180 separately comprise a low-pass filter 171, 181 and a programmable power amplifier 172, 182. The first orthogonal filtering amplifying unit 170 comprises a first low-pass filter 171 and a first programmable power amplifier 172, and the second orthogonal filtering amplifying unit 180 comprises a second low-pass filter 181 and a second programmable power amplifier 182. After the signal is filtered and amplified by the first orthogonal filtering amplifying unit 170 and the second orthogonal filtering amplifying unit 18, the power-amplified base frequency signal is obtained so as accomplish the receiving and down-conversion for the signal.

In the terms of the signal emission portion, initially, the base frequency emitting signal is received from the outside, and then received by the third orthogonal filtering amplifying unit 210 and the fourth orthogonal filtering amplifying unit 220 so as to filter and amplify the 2.4 GHz and 5 GHz band signals. The third orthogonal filtering amplifying unit 210 further comprises a third low-pass filter 211 and a third programmable power amplifier 212. The third low-pass filter 211 is connected to the third programmable power amplifier 212 so that the received base frequency signal to be sampled up is filtered and amplified. And then the signal is outputted to the third middle frequency wave-mixing device 203 in the second middle frequency wave-mixing unit 201 and the fifth middle frequency wave-mixing device 206 in the third middle frequency wave-mixing unit 202. The operation of the fourth orthogonal filtering amplifying unit 220 is similar with that of the third orthogonal filtering amplifying unit 210. The fourth low-pass filter 221 and the fourth programmable power amplifier 222 in the fourth orthogonal filtering amplifying unit 220 are used for filtering the received base frequency signal to be sampled up and for amplifying the base frequency signal. Thereafter, the signal is outputted to the fourth middle frequency wave-mixing device 204 in the second middle frequency wave-mixing unit 201 and the sixth middle frequency wave-mixing device 207 in the third middle frequency wave-mixing unit 202.

The emitting frequency selection unit 200 comprises a second and a third middle frequency wave-mixing unit 201, 202, and the second and the third middle frequency wave-mixing unit 201 and 202 are used to perform the band selection for the emitting signal. The orthogonal reference signal outputted by the orthogonal distributor 190 is inputted to the four middle frequency wave-mixing device 203, 204, 206, 207, and then the third middle frequency wave-mixing device 203 and the fourth middle frequency wave-mixing device 204 will separately output signals to the first wave-mixing device 205 installed in the second middle frequency wave-mixing unit 201. The first wave-mixing device 205 will sample up the signal so as to obtain an emitting frequency with middle frequency. Similarly, in the third middle frequency wave-mixing unit 202, by using the orthogonal reference signal outputted by the orthogonal distributor 190, the fifth middle frequency wave-mixing device 206 and the sixth middle frequency wave-mixing device 207 will separately output signals to the second wave-mixing device 208, and the second wave-mixing device 208 will sample up the base frequency signal.

Thereafter, by using the middle frequency signals outputted by the first wave-mixing device 201 and the second wave-mixing device 208, the first switch device 223, the second switch device 224, the third switch device 225 and the fourth switch device 226 are switched to accomplish the selection for emitting frequency. Namely, the selection for emitting frequency is accomplished by using the two middle frequency wave-mixing unit 201, 202 and the emitting frequency selection units of the four switches 223, 224, 225, 226. The second high frequency wave-mixing device 232 and the third high frequency wave-mixing device 233 installed in the first high frequency wave-mixing unit 230 will separately receive the middle frequency signal outputted by the first wave-mixing device 201 and the second wave-mixing device 208. By using the high frequency local oscillation signal outputted by the first high frequency local oscillator 120, the wave-mixing is processed on the middle frequency signal and then the processed signal will be outputted to the third wave-mixing device 231 so that the middle frequency signal is sampled up to the high frequency emitting signal. In this embodiment, the first high frequency wave-mixing unit 230 is set to perform the up sampling for the 2.4 GHz signal, and the second high frequency wave-mixing unit 240 is set to perform the up-sampling for the 5 GHz signal.

Similar with the first high frequency wave-mixing unit 230, the second high frequency wave-mixing unit 240 is operated by switching the third switch device 225 and the fourth switch device 226 to make the fourth high frequency wave-mixing device 242 and the fifth high frequency wave-mixing device 243 separately receive the middle frequency emitting signals outputted by the first wave-mixing device 201 and the second wave-mixing device 202. similarly, after the high frequency local oscillation signal outputted by the first high frequency local oscillator 120 is wave-mixed, the signal is outputted to the fourth wave-mixing device 241 so as to accomplish the up-sampling for the 5 GHz signal.

In the first high frequency wave-mixing unit 230 and the second high frequency wave-mixing unit 240, after the third wave-mixing device 231 and the fourth wave-mixing device 241 separately finish the up-sampling for the signals, the signals are separately outputted to the front end amplifiers 250 and 260. The first front end amplifier 250 and the second front end amplifier 260 will separately perform the front end amplifying for the signals, and then the high frequency emitting signals will be outputted to the first power amplifier 41 and the second power amplifier 42 in the power amplifying device 40 outside of the high frequency integrated circuit 10. Thereafter, the transmitting/receiving antennas 20 and 30 will emit the signals.

In the high frequency integrated circuit 10, after the local oscillator 130 receives the signal outputted by the first phase lock loop 140, the first high frequency local oscillator 120 and the orthogonal distributor 190 will output the local reference oscillation signal to the first high frequency local oscillator 120 and the orthogonal distributor 190 for performing the orthogonalizing and wave-mixing for the signal.

Figure 3:
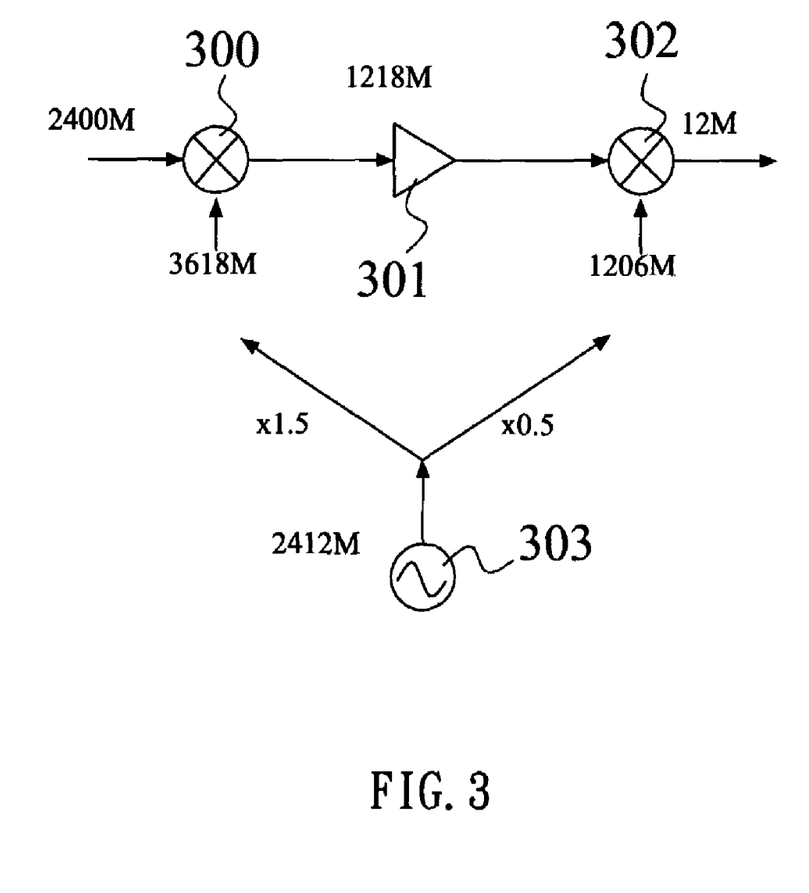
FIG. 3 is a perspective diagram of the down conversion for the 2.4 GHz band signal according to the embodiment of the present invention.

The above is the description for the circuit according to the embodiment of the present invention. In the terms of the down conversion for the signal, please refer to FIG. 3. FIG. 3 is a perspective diagram of the down conversion of the 2.4 GHz band signal according to the embodiment of the present invention. The local oscillator 303 separately outputs 1.5 frequency multiplying and 0.5 frequency multiplying down-converted signals of 2412 MHz (Megahertz) to be reference band-mixing signals for the down conversion. When the 1.5 frequency-multiplying signal is outputted, the signal frequency is 3618 (2412×3/2) MHz. The signal is inputted to the first down-conversion wave-mixing device 300. The first down-conversion wave-mixing device 300 further receives a 2400 MHZ signal to be processed by band-mixing, and therefore, the 1218 MHz first down conversion receiving signal is outputted, and then the signal is amplified by the first amplifier 301 and is inputted to the second down-conversion wave-mixing device 302. The second down-conversion wave-mixing device 302 further receives the 0.5 frequency multiplying reference band-mixing signal outputted by the local oscillator 303. Namely, it further receives the 1206 MHz (2412/2=1206) band-mixing signal, and therefore, the second down-conversion wave-mixing device 302 will process the signal so as to obtain a 12 MHz base frequency receiving signal.

Figure 4:
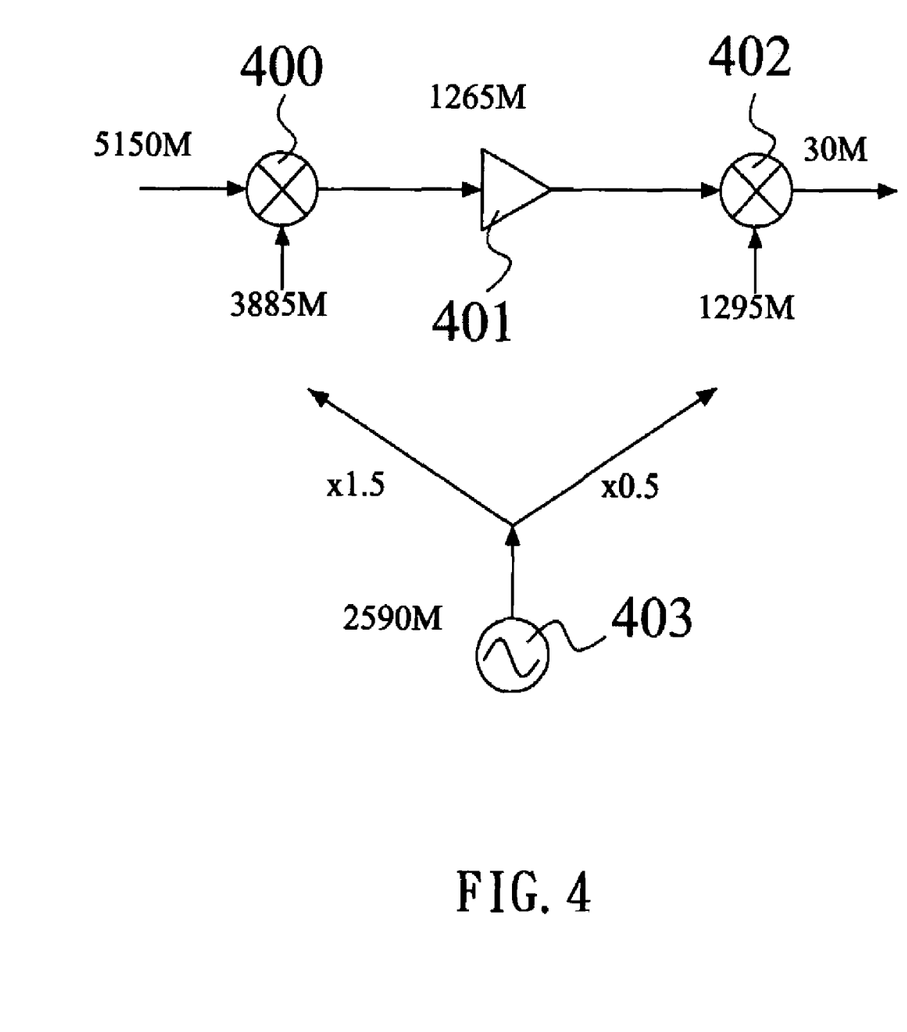
FIG. 4 is a perspective diagram of the down conversion for the 5 GHz band signal according to the embodiment of the present invention.

Please refer to FIG. 4. FIG. 4 is a perspective diagram of the down conversion for the 5 GHz band signal according to the embodiment of the present invention. Similar to the down conversion for the 2.4 GHz signal, the local oscillator 403 is used for outputting the 1.5 frequency multiplying and 0.5 frequency multiplying down-converted signals of 2590 MHz to be the reference band-mixing signals for the down conversion. When the 1.5 frequency-multiplying signal is outputted, the signal frequency is 3885 (2590×3/2) MHZ and is inputted to the third down-conversion wave-mixing device 400. The third down-conversion wave-mixing device 400 further receives a 5150 MHz signal to be processed by band-mixing, and therefore, the third down-conversion wave-mixing device 400 will output the 1265 MHz first down conversion receiving signal. Thereafter, the second amplifier 401 will amplify the signal and then input it to the fourth down-conversion wave-mixing device 402. The fourth down-conversion wave-mixing device 402 further receives the 0.5 frequency multiplying reference band-mixing signal outputted by the local oscillator 403. Namely, it further receives the 1295 MHz (2590/2=1295) band-mixing signal, and therefore, the fourth down-conversion wave-mixing device 402 will process the signal so as to obtain the 30 MHz base frequency receiving signal.

According to the description of FIG. 3 and FIG. 4, the 2.4 GHz and 5 GHz receiving signals are converted down so as to obtain the base frequency signal of which the frequency is within the normal range of the frequency for the voice processing. Therefore, the voice processor is so designed that the receiving and modulating for the signal can be accomplished. The first down-conversion wave-mixing device 300 and the third down-conversion wave-mixing device 400 shown in FIG. 3 and FIG. 4 are equivalent to the first high frequency wave-mixing device 110 shown in FIG. 1, and are used for converting down the high frequency signal. The second down-conversion wave-mixing device 302 and the fourth down-conversion wave-mixing device 402 are equivalent to the first middle frequency wave-mixing device 161 and the second middle frequency wave-mixing device 162 in the middle frequency wave-mixing unit 160.

Figure 5:
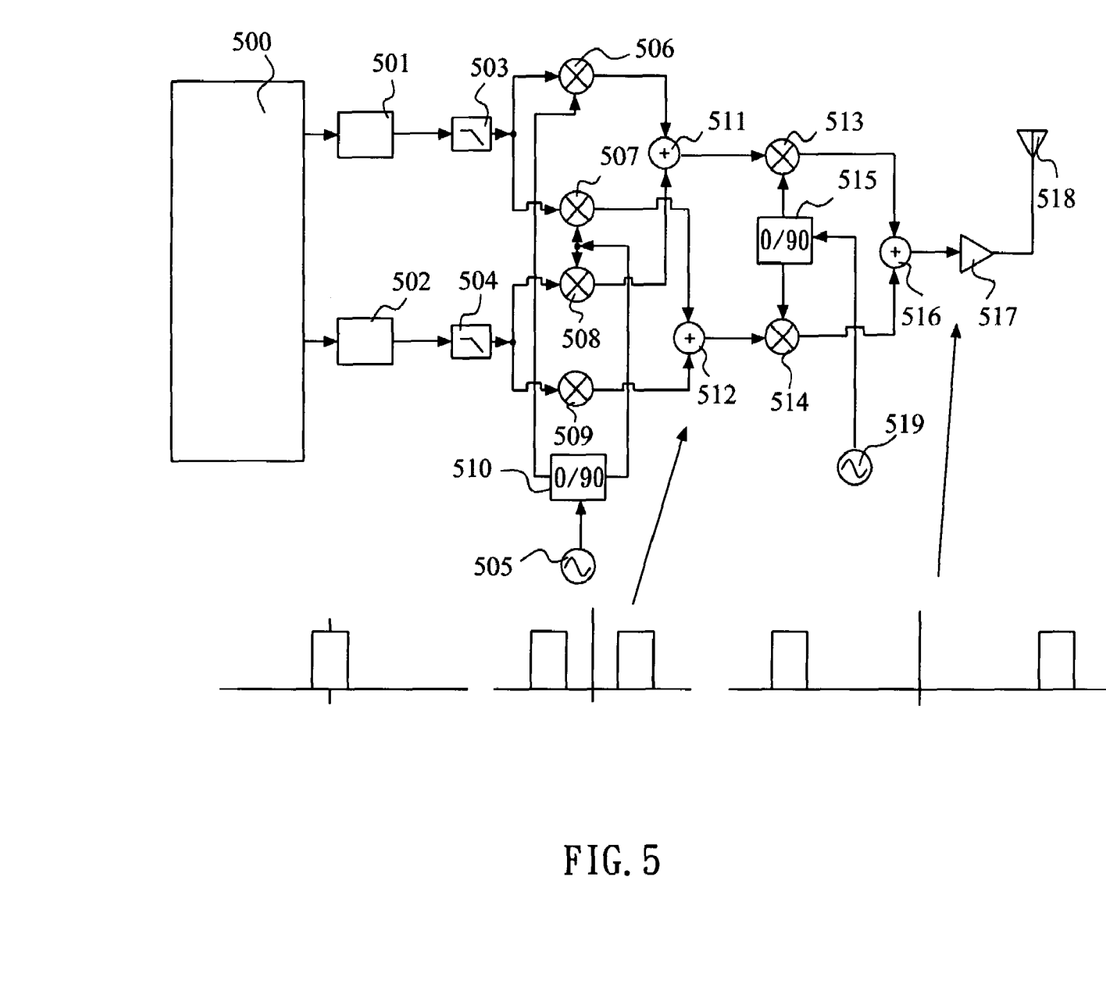
FIG. 5 is a perspective diagram of a circuit for emitting a signal according to the present invention.

Besides, in the terms of the portion for emitting the signal, as the mentioned above, after the high frequency receiving signal is converted down, the appropriate voice processor is applied for performing the following modulating for the signal. Therefore, in the embodiment of the present invention, a digital signal processor (DSP) is used for processing the voice signal. Please refer to FIG. 5. FIG. 5 is a perspective diagram of a circuit for emitting a signal according to the present invention. After the digital signal processor 500 processes the signal, the digital emitting signal will be outputted to a first digital-to-analog converter 501 and a second digital-to-analog converter 502 for converting the digital signal into an analog signal, and then the analog emitting base frequency signal will be outputted to the first filter 503 and the second filter 504. Thereafter, the up-sampling for the emitting signal will be performed which is the same as that described in FIG. 2, and it will be superfluous to describe therein.

The above is the detailed description of the present invention, and by using a single high frequency integrated circuit, the down conversion and up sampling for the multi-band signal can be accomplished.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A dual band transceiver architecture for wireless communication comprising:
a first transmitting/receiving antenna for receiving and emitting a first band signal, and connected to a first band-pass filter and a first switch, and connected to a first power amplifier and a first balance/imbalance device by switching the switch;
a second transmitting/receiving antenna for receiving and emitting a second band signal, and connected to a second band-pass filter and a second switch, and connected to a second power amplifier and a second balance/imbalance device by switching the switch;
a high frequency integrated circuit comprising:
a signal receiving portion, coupling with the first and second switches via the first and second balance/imbalance devices, respectively, down-converting the signal received by the first transmitting/receiving antenna to a first middle frequency and then to a first base frequency, down-converting the signal received by the second transmitting/receiving antenna to a second middle frequency and then to a second base frequency,
a signal emission portion, coupling to the first and second switches via the first and second power amplifiers, respectively, and up-converting signals which will be emitted by the first or second transmitting/receiving antennas; and
a single frequency synthesizer, providing band-mixing signals for the down-conversion of the signal receiving portion and the up-conversion of the signal emission portion, wherein the first middle frequency approximates the second middle frequency,
wherein the signal receiving portion comprises:
a receiving frequency selection unit for receiving the signals outputted by the first or second balance/imbalance device and connected to a first high frequency wave-mixing device;
the first high frequency wave-mixing device for receiving the signals outputted by the receiving frequency selection unit and a first high frequency local oscillator and outputting the signals to a first middle frequency amplifying device;
the first middle frequency amplifying device for receiving the signal transmitted by the first high frequency wave-mixing device, amplifying the signal and outputting the amplified signal to a first middle frequency wave-mixing unit;
the first middle frequency wave-mixing unit for receiving the signal outputted by the first middle frequency amplifying device, performing wave-mixing after receiving a signal outputted by an orthogonal distributor, and outputting the signal to a first orthogonal filtering amplifying unit and a second orthogonal filtering amplifying unit;
wherein the down conversion for the signal is accomplished by modulating the signals with different bands.

2. The dual band transceiver architecture for wireless communication according to the claim 1, wherein the carrier frequency of the first band signal is about 2.4GHz and the carrier frequency of the second band signal is about 5 GHz.

3. The dual band transceiver architecture for wireless communication according to the claim 1, wherein the receiving frequency selection unit further comprises a first low noise amplifier and a second low noise amplifier.

4. The dual band transceiver architecture for wireless communication according to the claim 1, wherein the first high frequency wave-mixing device further receives the signal outputted by a first high frequency local oscillator.

5. The dual band transceiver architecture for wireless communication according to the claim 1, wherein the first middle frequency wave-mixing unit further comprises a first middle frequency wave-mixing device and a second middle frequency wave-mixing device.

6. The dual band transceiver architecture for wireless communication according to the claim 1, wherein the first orthogonal filtering amplifying unit further comprises a first low-pass filter and a first programming gain amplifier.

7. The dual band transceiver architecture for wireless communication according to the claim 1, wherein the second orthogonal filtering amplifying unit further comprises a second low-pass filter and a second programmable gain amplifier.

8. The dual band transceiver architecture for wireless communication according to the claim 1, wherein before the signal emission portion in the high frequency integrated circuit performs the up-conversion, a digital signal processor is used for processing signal, and then the processed signal is separately outputted to a first digital-to-analog converter and a second digital-to-analog converter for converting the digital signal into an analog signal, and then the converted signal is separately outputted to a third orthogonal filtering amplifying unit and a fourth orthogonal filtering amplifying unit.

9. The dual band transceiver architecture for wireless communication according to the claim 8, wherein the signal emission portion comprises:
the third orthogonal filtering amplifying unit and the fourth orthogonal filtering amplifying unit for separately performing the filtering and amplifying for the signal so as to separately output the signal to an emitting frequency selection unit;
the emitting frequency selection unit for receiving the signals outputted by the two different orthogonal filtering amplifying units and then performing the selection for the signal band and processing the middle frequency wave-mixing so as to output two signals with different bands to a first high frequency wave-mixing unit and a second high frequency wave-mixing unit;
the first high frequency wave-mixing unit and the second high frequency wave-mixing unit for receiving the signal outputted by the emitting frequency selection unit and then processing the high frequency wave-mixing for the signal so as to separately output the signal to a first front end amplifier and a second front end amplifier;
the first front end amplifier and the second front end amplifier for separately receiving the signals outputted by the first high frequency wave-mixing unit and the second high frequency wave-mixing unit and then performing the front end amplifying for the signal so as to separately output the signal to the power amplifying device;
wherein the up-conversion for the signal is accomplished by modulating the signals with different bands.

10. The dual band transceiver architecture for wireless communication according to the claim 9, wherein the third orthogonal filtering amplifying unit comprises a third low-pass filter and a third programmable gain amplifier.

11. The dual band transceiver architecture for wireless communication according to the claim 9, wherein the fourth orthogonal filtering amplifying unit comprises a fourth low-pass filter and a fourth programmable gain amplifier.

12. The dual band transceiver architecture for wireless communication according to the claim 9, wherein the emitting frequency selection unit comprises a second middle frequency wave-mixing unit and a third middle frequency wave-mixing unit.

13. The dual band transceiver architecture for wireless communication according to the claim 12, wherein the second middle frequency wave-mixing unit comprises a third middle frequency wave-mixing device, a fourth middle frequency wave-mixing device and a first wave-mixing device.

14. The dual band transceiver architecture for wireless communication according to the claim 13, wherein the third middle frequency wave-mixing device receives the signals outputted by the orthogonal distributor and the third orthogonal filtering amplifying unit, and the fourth middle frequency wave-mixing device receives the signals outputted by the orthogonal distributor and the fourth orthogonal filtering amplifying unit.

15. The dual band transceiver architecture for wireless communication according to the claim 12, wherein the third middle frequency wave-mixing unit comprises a fifth middle frequency wave-mixing device, a sixth middle frequency wave-mixing device and a second wave-mixing device.

16. The dual band transceiver architecture for wireless communication according to the claim 15, wherein the fifth middle frequency wave-mixing device receives the signals outputted by the orthogonal distributor and the third orthogonal filtering amplifying unit, and the sixth middle frequency wave-mixing device receives the signals outputted by the orthogonal distributor and the fourth orthogonal filtering amplifying unit.

17. The dual band transceiver architecture for wireless communication according to the claim 9, wherein after a second high frequency wave-mixing device and a third high wave-mixing device perform the wave-mixing for the high frequency signal, the first high frequency wave-mixing unit will output the signal to a third wave-mixing device.

18. The dual band transceiver architecture for wireless communication according to the claim 17, wherein the second high frequency wave-mixing device receives the signal outputted by the first high frequency local oscillator, and receives the signal outputted by the second middle frequency wave-mixing unit via the controlling of a first switch device.

19. The dual band transceiver architecture for wireless communication according to the claim 17, wherein the third high frequency wave-mixing device receives the signal outputted by the first high frequency local oscillator, and receives the signal outputted by the third middle frequency wave-mixing unit via the controlling of a second switch device.

20. The dual band transceiver architecture for wireless communication according to the claim 9, wherein after a fourth high frequency wave-mixing device and a fifth high frequency wave-mixing device perform the wave-mixing for the high frequency signal, the second high frequency wave-mixing unit will output the signal to a fourth wave-mixing device.

21. The dual band transceiver architecture for wireless communication according to the claim 20, wherein the fourth high wave-mixing device receives the signal outputted by the first high frequency local oscillator, and receives the signal outputted by the second middle frequency wave-mixing unit via the controlling of a third switch device.

22. The dual band transceiver architecture for wireless communication according to the claim 20, wherein the fifth high frequency wave-mixing device receives the signal outputted by the first high frequency local oscillator, and receives the signal outputted by the third middle frequency wave-mixing unit via the controlling of a fourth switch device.

23. The dual band transceiver architecture for wireless communication according to the claim 1, wherein after a first local oscillator receives the signal outputted by a first phase lock device, it will oscillate the signal and output the signal to the first high frequency local oscillator and the orthogonal distributor.

24. The dual band transceiver architecture for wireless communication according to the claim 1, wherein the signal reception portion performs the down conversion according to reference band-mixing signals which are 1.5 frequency multiplying and 0.5 frequency multiplying down-converted signals separately outputted by the first local oscillator.

25. The dual band transceiver architecture or wireless communication according to the claim 24, wherein the 1.5 frequency multiplying down-converted signal outputted by the first local oscillator is inputted into the first high frequency wave-mixing device for band-mixing.

26. The dual band transceiver architecture for wireless communication according to the claim 24, wherein the 0.5 frequency multiplying down-converted signal outputted by the first local oscillator is inputted into the first middle frequency wave-mixing unit for band-mixing.

27. A dual band transceiver architecture for wireless communication comprising:
- a first transmitting/receiving antenna for receiving and emitting a first band signal, and connected to a first band-pass filter and a first switch, and connected to a first power amplifier and a first balance/imbalance device by switching the switch;
- a second (transmitting/receiving antenna for receiving and emitting a second band signal, and connected to a second band-pass filter and a second switch, and connected to a second power amplifier and a second balance/imbalance device by switching the switch;
- a high frequency integrated circuit comprising:
- a signal receiving portion, coupling with the first and second switches via the first and second balance/imbalance devices, respectively, down-converting the signal received by the first transmitting/receiving antenna to a first middle frequency and then to a first base frequency, and down-converting the signal received by the second transmitting/receiving antenna to a second middle frequency and then to a second base frequency;
- a signal emission portion, coupling to the first and second switches via the first and second power amplifiers, respectively, up-converting signals which will be emitted by the first or second transmitting/receiving antennas, and comprising:
- a third orthogonal filtering amplifying unit and a fourth orthogonal filtering amplifying unit for separately performing the filtering and amplifying for the signal so as to separately output the signal to an emitting frequency selection unit;
- the emitting frequency selection unit for receiving the signals outputted by the two different orthogonal filtering amplifying units and then performing the selection for the signal band and processing the middle frequency wave-mixing so as to output two signals with different bands to a first high frequency wave-mixing unit and a second high frequency wave-mixing unit;
- the first high frequency wave-mixing unit and the second high frequency wave-mixing unit for receiving the signal outputted by the emitting frequency selection unit and then processing the high frequency wave-mixing for the signal so as to separately output the signal to a first front end amplifier and a second front end amplifier;
- the first front end amplifier and the second front end amplifier for separately receiving the signals outputted by the first high frequency wave-mixing unit and the second high frequency wave-mixing unit and then performing the front end amplifying for the signal so as to separately output the signal to the first and second power amplifiers;
- wherein the up-conversion for the signal is accomplished by modulating the signals with different bands; and
- a single frequency synthesizer, providing band-mixing signals for the down-conversion of the signal receiving portion and the up-conversion of the signal emission portion, wherein the first middle frequency approximates the second middle frequency.

* * * * *